United States Patent
Dwyer et al.

(10) Patent No.: US 6,671,567 B1
(45) Date of Patent: Dec. 30, 2003

(54) VOICE FILE MANAGEMENT IN PORTABLE DIGITAL AUDIO RECORDER

(75) Inventors: John J. Dwyer, Stratford, CT (US); David K. Godin, Wilton, CT (US); Richard S. Colon, Sr., Stratford, CT (US); Stephen Rothschild, Ridgefield, CT (US); John J. Pawlowski, Shelton, CT (US); John C. Vaughan, Norwalk, CT (US)

(73) Assignee: Dictaphone Corporation, Stratford, CT (US)

( * ) Notice: Subject to any disclaimer, the term of this patent is extended or adjusted under 35 U.S.C. 154(b) by 0 days.

(21) Appl. No.: 09/190,196

(22) Filed: Nov. 12, 1998

Related U.S. Application Data

(60) Provisional application No. 60/066,748, filed on Nov. 21, 1997.

(51) Int. Cl.$^7$ ............................ G06F 17/00; G11B 19/00
(52) U.S. Cl. .................... 700/94; 369/25.01; 369/29.02
(58) Field of Search ............................ 700/94; 704/270, 704/272, 278; 369/25, 25.01, 29.01, 29.02

(56) References Cited

U.S. PATENT DOCUMENTS

| | | |
|---|---|---|
| 4,319,337 A | 3/1982 | Sander et al. |
| 4,837,830 A | 6/1989 | Wrench, Jr. et al. |
| 5,033,077 A | 7/1991 | Bergeron et al. |
| 5,146,439 A | 9/1992 | Jachmann et al. |
| 5,216,744 A | 6/1993 | Alleyne et al. |
| 5,265,075 A | 11/1993 | Bergeron et al. |
| 5,294,229 A | 3/1994 | Hartzell et al. |
| 5,398,220 A | 3/1995 | Barker |
| 5,423,034 A | 6/1995 | Cohen-Levy et al. |
| 5,444,768 A | 8/1995 | Lemaire et al. |
| 5,477,511 A | * 12/1995 | Englehardt .................. 704/270 |
| 5,481,645 A | 1/1996 | Bertino et al. |
| 5,491,774 A | 2/1996 | Norris et al. |
| 5,548,566 A | 8/1996 | Barker |
| 5,568,538 A | 10/1996 | Tamir et al. |
| 5,729,734 A | 3/1998 | Parker et al. |
| 5,742,736 A | 4/1998 | Haddock |
| 5,774,841 A | 6/1998 | Salazar et al. |
| 5,799,280 A | 8/1998 | Degen et al. |
| 5,812,882 A | 9/1998 | Raji et al. |
| 5,818,800 A | 10/1998 | Barker |
| 5,839,108 A | 11/1998 | Daberko et al. |
| 5,898,916 A | 4/1999 | Breslawsky |

(List continued on next page.)

FOREIGN PATENT DOCUMENTS

| | | | | |
|---|---|---|---|---|
| EP | 1041567 A2 | * | 3/2000 | .................. 700/94 |

OTHER PUBLICATIONS

Lisa Joy Stifelman, "VoiceNotes: An Application for a Voice–Controlled Hand–Held Computer", Jun. 1992.

Primary Examiner—Xu Mei
(74) Attorney, Agent, or Firm—Howrey Simon Arnold & White, LLP; Anthony L. Meola

(57) ABSTRACT

A portable digital voice recorder is interfaced for data communication with a personal computer. Voice data files are stored in the portable recorder together with header data which indicates the status of the voice data files. In response to a batch upload command, selected ones of the voice data files are uploaded to the personal computer, depending on the status of the voice data files as indicated by the status data. Graphical user interface software running in the PC causes the PC to display icons indicative of voice data files stored in the portable recorder. The header data in the portable recorder may be changed by operation of the PC's graphical user interface. For example, file designations indicated by header data in the portable recorder may be changed by editing corresponding fields displayed by the PC.

18 Claims, 10 Drawing Sheets

U.S. PATENT DOCUMENTS

| | | | |
|---|---|---|---|
| 5,903,871 A | * 5/1999 | Terui et al. | 704/500 |
| 5,982,857 A | 11/1999 | Brady | |
| 5,986,568 A | 11/1999 | Suzuki et al. | |
| 6,038,199 A | * 3/2000 | Pawlowski et al. | 369/25 |
| 6,122,614 A | 9/2000 | Kahn et al. | |
| 6,175,822 B1 | 1/2001 | Jones | |
| 6,282,154 B1 | * 8/2001 | Webb | 369/25 |
| 6,308,158 B1 | 10/2001 | Kuhnen et al. | |
| 6,321,129 B1 | 11/2001 | D'Agosto, III | |
| 6,356,754 B1 | 3/2002 | Onozawa et al. | |

* cited by examiner

DIGITAL PORTABLE RECORDER

(BLOCK DIAGRAM)

RECORDER SOFTWARE

PC SOFTWARE FOR MANAGING PORTABLE RECORDER

VOICE FILE MANAGEMENT IN PORTABLE DIGITAL AUDIO RECORDER

CROSS-REFERENCE TO RELATED APPLICATION

This is a continuation-in-part of provisional patent application serial No. 60/066,748, filed Nov. 21, 1997.

BACKGROUND OF THE INVENTION

Pocket-sized voice recorders are widely used as a convenient way to take notes, store information and create documents in audio form. Among other applications, the recorded information may be transcribed to present the information in written form.

In recent years, compact audio recorders have been proposed in which the audio information is stored as digital data in a solid state memory. In some cases, a removable memory card is used as the storage medium.

Prior art embodiments of compact digital audio recorders have, to date, fallen short in terms of making it convenient for the user to manage the audio files stored in the recording device or removable recording medium. The prior art has also failed to provide for satisfactory integration of portable digital audio recorders with other information management devices, such as personal computers and computer networks. Another subject not adequately addressed by the prior art is how to conveniently transfer digital audio files from portable recorders to other devices such as PC's.

OBJECTS AND SUMMARY OF THE INVENTION

It is accordingly an object of the invention to provide for convenient management of audio information stored in a portable digital audio recorder.

It is a further object of the invention to provide effective and convenient interaction between a portable digital recorder and a personal computer.

According to an aspect of the invention, there is provided a voice data management system, including a portable digital voice recorder which includes a housing shaped and sized to fit in a user's hand, a microphone secured to the housing, and a memory device mounted in the housing for storing voice data files which correspond to audio signals generated by the microphone, the memory device also storing respective status data for each voice data file stored by the memory device, the status data being for the purpose of indicating a status of the respective voice data file, and the system further including a personal computer, structure for providing a data signal transmission path connecting the memory device to the personal computer, and a control device for receiving an upload signal and for responding to the received upload signal by selecting ones of the voice data files on the basis of the respective status data for the voice data files and uploading the selected voice data files to the personal computer by way of the data signal transmission path.

According to another aspect of the invention, the control device referred to in the preceding paragraph changes the status data for the uploaded voice data files after the same have been uploaded to the PC in response to the upload signal.

According to a further aspect of the invention, there is provided a method of uploading voice data files from a portable digital voice recorder to a data processing device, the method including the steps of storing voice data files in the portable digital voice recorder, associating respective status data with each voice data file stored in the portable digital voice recorder, interfacing the portable digital voice recorder to the data processing device to permit data communication between the recorder and the data processing device, and selectively transferring the stored voice data files from the portable digital voice recorder to the data processing device in accordance with the respective status data associated with each stored voice data file.

According to still another aspect of the invention, the personal computer in the above-described voice data management system provides a graphical user interface which allows a user of the personal computer to cause the personal computer to generate a data management signal, and the data management signal is transmitted from the personal computer to the control device, which is part of the portable digital voice recorder. The control device responds to the data management signal by changing the header data associated with at least one of the voice data files stored in the memory device.

According to yet another aspect of the invention, voice data file header data is uploaded from the portable digital recorder to the personal computer without uploading the corresponding voice data files.

According to a further aspect of the invention, there is provided a method of operating a portable digital voice recorder, including the steps of storing voice files in the recorder, storing header data in the recorder in association with the stored voice files, interfacing the recorder to a personal computer which includes a display, and displaying on the PC display icons corresponding to the voice files stored in the portable recorder. Still further, the icons displayed by the PC may include alphanumeric information corresponding to the header data stored in the recorder, and the personal computer may be operated to change the alphanumeric information included in the displayed icons, and in response, the corresponding header data in the portable recorder is also changed.

The apparatus and practices provided in accordance with the invention permit the user to apply the file management capabilities of a personal computer to managing voice data files stored in a compact digital voice recorder which is connected to the PC. This overcomes limitations of user interfaces commonly provided in compact audio recorders. In addition, the process of transferring voice data files from the compact recorder to the personal computer is optimized, thereby further aiding in management of voice information. With the apparatus and practices described herein, a compact digital audio recorder can be utilized as a highly efficient, portable and flexible input device through which voice-generated information can be conveniently introduced into powerful desk- and enterprise-based data processing equipment.

Other objects, features and advantages of the invention will be become apparent from the subsequent more detailed description of preferred embodiments.

DESCRIPTION OF PREFERRED EMBODIMENTS

Figure 1:
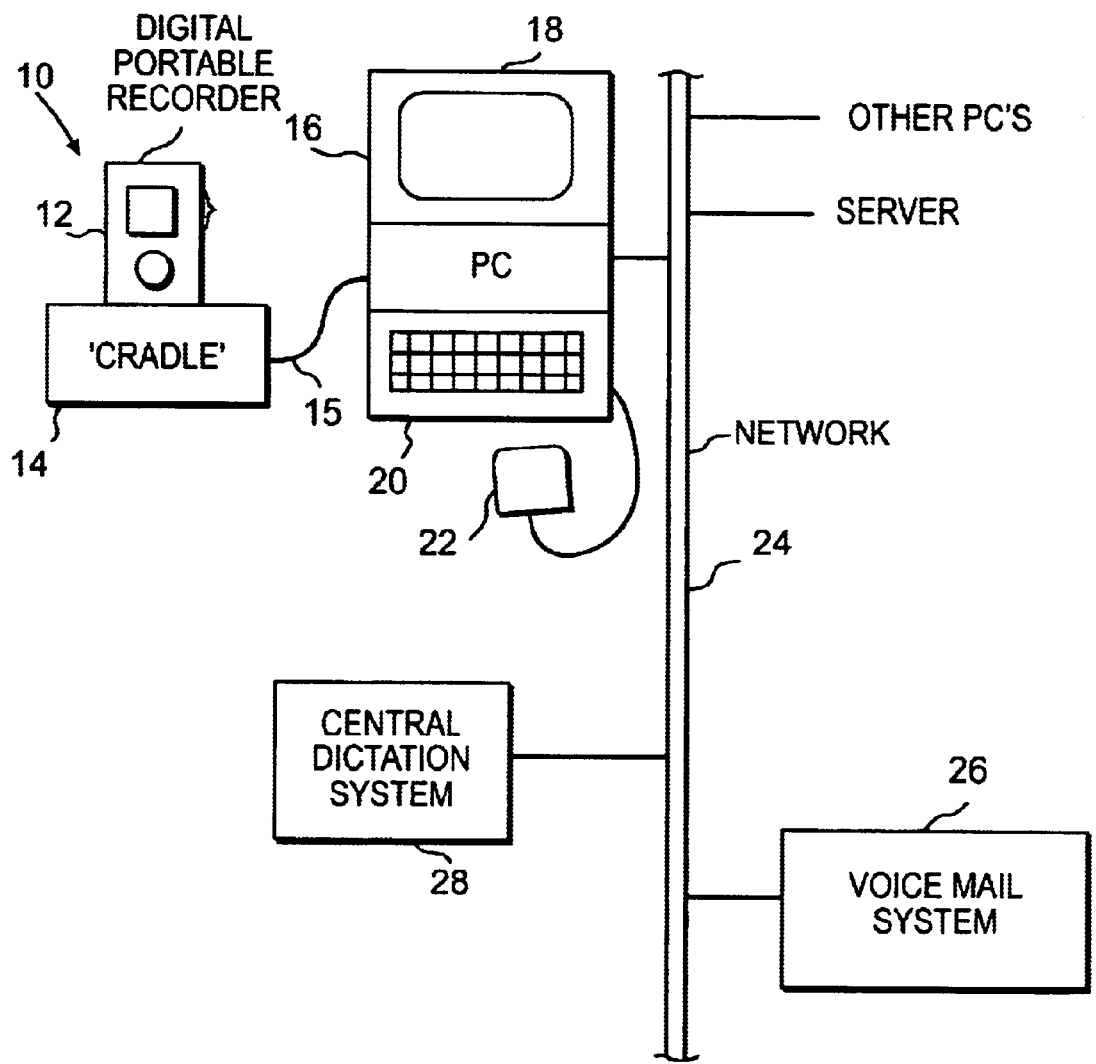
FIG. 1 is a block diagram of a voice data management system provided in accordance with the present invention.

An embodiment of the invention will now be described, initially with reference to FIG. 1. In FIG. 1, reference numeral 10 generally indicates a voice data management system provided in accordance with the invention. The voice data management system 10 includes a portable digital voice recorder 12 which is shown resting on a docking station or "cradle" 14. A cable 15 connects the cradle 14 to a personal computer 16. The cradle forms part of a signal path which permits the exchange of digital data between the portable recorder 12 and the PC 16.

The PC 16 is preferably of conventional construction, including a display 18, keyboard 20 and mouse 22. Software which is provided in accordance with the invention and described below is installed in the PC 16 to control the PC 16 in connection with its interaction with the portable recorder 12. As will be seen, it is preferred that the PC 16 be programmed with a conventional operating system which provides a graphical user interface (GUI). One of the best-known operating systems of this type is "Windows 95", published by Microsoft.

Also shown in FIG. 1 is a local area network (LAN) 24 which provides for data communication among the PC 16 and other system components, including other personal computers, a network server device, a voice mail system 26 and a central dictation system 28. Like the LAN 24, the other system components just enumerated may all be conventional items.

OVERVIEW OF PORTABLE RECORDER

Figure 2:
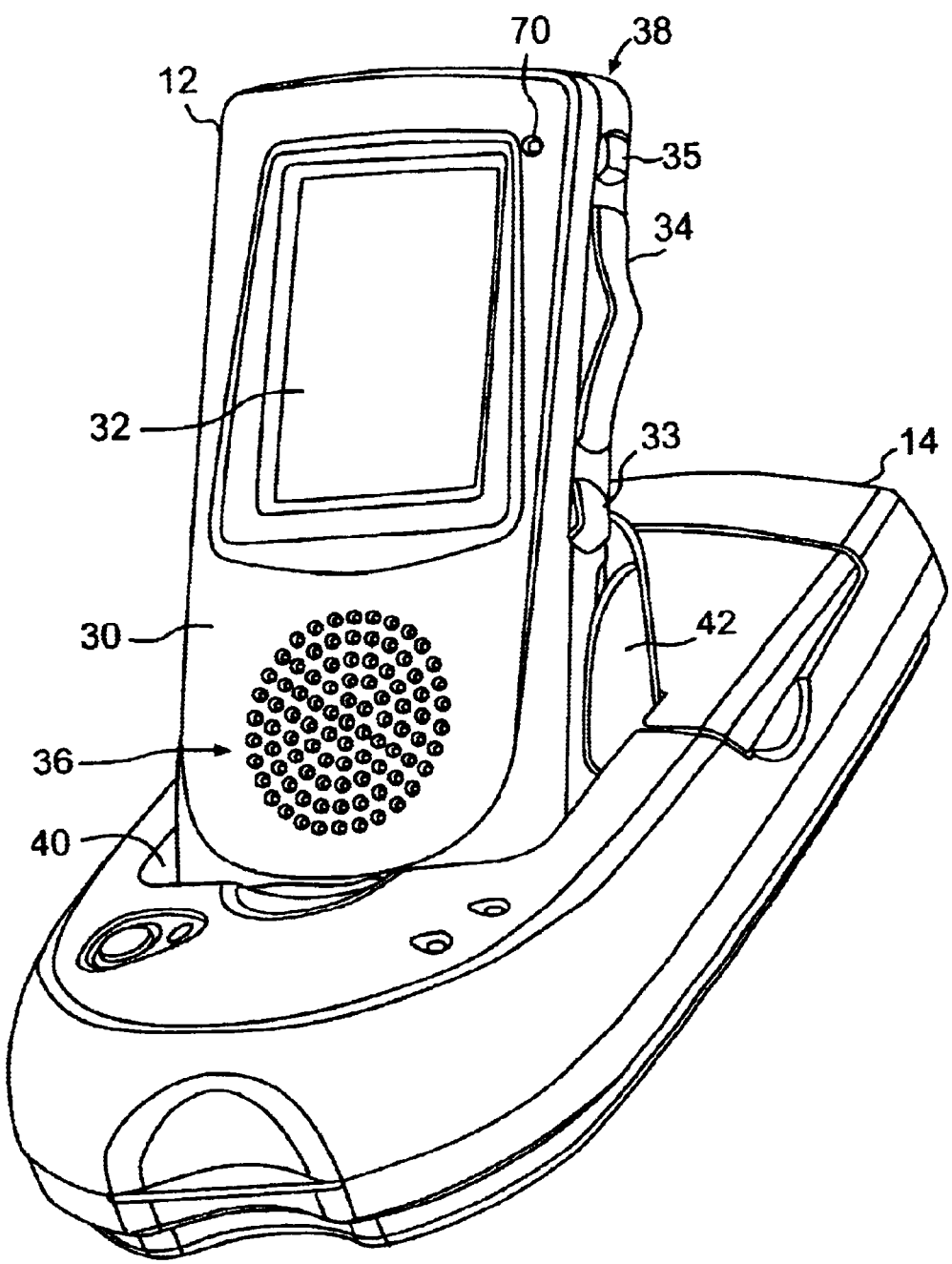
FIG. 2 is a perspective view of a portable digital voice recorder and a docking station which are part of the system of FIG. 1.

FIG. 2 is a perspective view showing some details of the portable recorder 12 and cradle 14. As seen in FIG. 2, the portable recorder 12 includes a housing 30, on which are mounted a display screen 32 and a slide switch 34. The recorder 12 may be like recorders disclosed in co-pending application Ser. No. 09/177,028, filed Oct. 22, 1998. The recorder 12 is preferably a very compact item, such that the housing 30 is shaped and sized to fit in the user's hand. The display screen 32 is preferably a touch screen which allows the user to interact with the recorder 12 in a manner similar to that employed in so-called "personal digital assistants". A stylus (not shown) may be provided with the recorder to aid in inputting user selections via the touch screen.

The slide switch 34 is used to control conventional functions provided in a portable voice recorder, such as "record", "play", "rewind", and "stop". The functioning of the slide switch preferably emulates the user interface provided by high-end tape-based dictation units, so that users familiar with conventional dictation practices can easily adapt to using the digital recorder described herein. Push buttons 33, 35 may provide additional functions, such as "fast forward" or "cue". Alternatively, one of the buttons may control backlighting for the screen 32.

Other salient features of the recorder 12 include a grille region 36 in the housing, provided to cover a speaker which is built into the recorder. The recorder 12 also includes a microphone which is not shown in FIG. 2, but is preferably installed at a corner 38 of the housing near the slide switch 34.

The recorder 12 rests in a recess 40 of the cradle 14 and reclines against a lid 42 for the recess 40. Provided within the recess 40 of the cradle 14, and not visible in FIG. 2, is a parallel data connection which mates with a corresponding connection in the base of the recorder housing 30. The recorder parallel connection also is not visible in the drawing.

Figure 3:
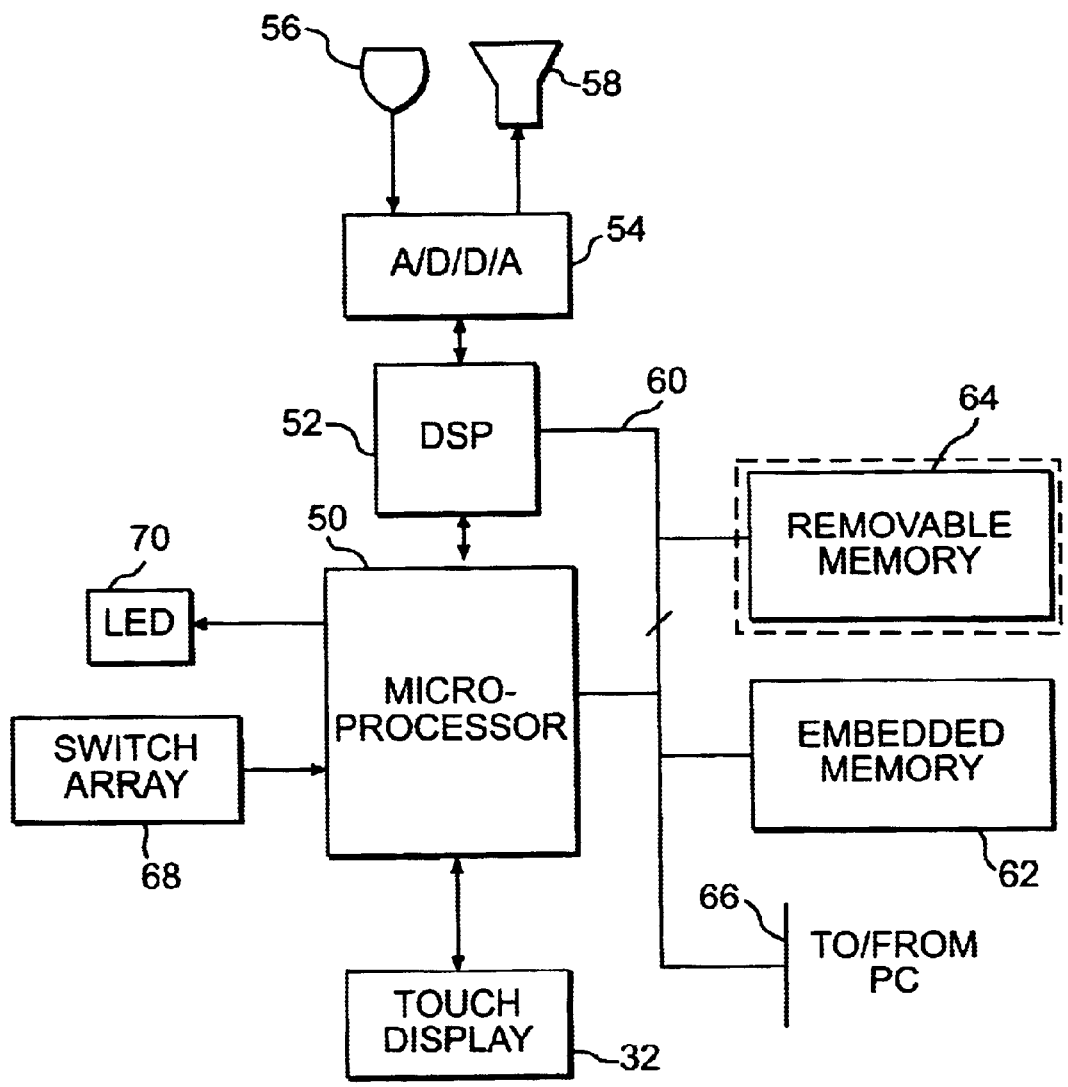
FIG. 3 is a block diagram representation of electrical and electronic components of the portable recorder of FIG. 2.

Electric and electronic components of the recorder 12 are illustrated in block diagram form in FIG. 3. It is to be understood that the components shown in FIG. 3 are mounted within or on the recorder housing 30 (FIG. 2).

Continuing to refer to FIG. 3, a microprocessor or microcontroller 50 is mounted within the recorder and controls operations of the recorder. The microprocessor 50 is connected to a digital signal processing circuit 52 and exchanges command and data messages with the DSP 52. The DSP 52 is, in turn, connected to a circuit 54 which performs analog-to-digital and digital-to-analog signal conversion functions. The recorder also has a built-in microphone 56 and speaker 58 which are connected to the A/D and D/A circuit 54. (To simplify the drawing, signal conditioning circuits such as filters and amplifiers are not shown.) A multi-bit signal bus 60 interconnects the microprocessor 50 with the DSP 52 as well as an embedded memory device 62, a removable memory card 64, and the above-mentioned parallel data port 66 by which data may be exchanged with the personal computer. The removable memory card 64 may be used primarily for storing voice files and associated header data (to be described below), and the embedded memory 62 may be used primarily for program and working memory. However, these roles may be shared or reversed.

The microprocessor 50 is also interconnected with the above-mentioned touch screen 32, by which the microprocessor 50 provides information to the user of the recorder, and through which the user inputs information to the microprocessor 50. Also providing input to the microprocessor 50 is a switch array 68 which is actuatable by the user by means of the above-mentioned slide switch 34 (FIG. 2). Illustrated in both FIGS. 2 and 3 is a light emitting diode 70 which is selectively illuminated by the microprocessor 50 to indicate when voice recording is taking place.

According to a preferred embodiment of the invention, the portable recorder incorporates features and functions found in known personal digital assistant devices, in addition to voice recording and playback and voice file management capabilities as described herein. Thus, the recorder 12 may also function as an electronic address book, appointment book and calculator. The recorder 12 may also store to-do lists (with timed reminders) and may be used to generate and/or review voice mail and/or electronic text mail messages either generated in the recorder for forwarding via the personal computer or downloaded to the recorder from the PC.

It will be understood that the recorder also provides via the touch screen 32 a menu which allows the user to select among the functions provided by the recorder. It is, however, preferred that the user be allowed to access recording and editing functions via the slide switch 34, and without resort to the menu. In addition, it is contemplated to allow the user to control recording, editing and playback functions via the touch screen, which also may be used to navigate among voice files and to select an existing voice file for playback and/or additional recording.

RECORDER SOFTWARE AND VOICE FILE HEADER DATA FORMAT

Figure 4A:
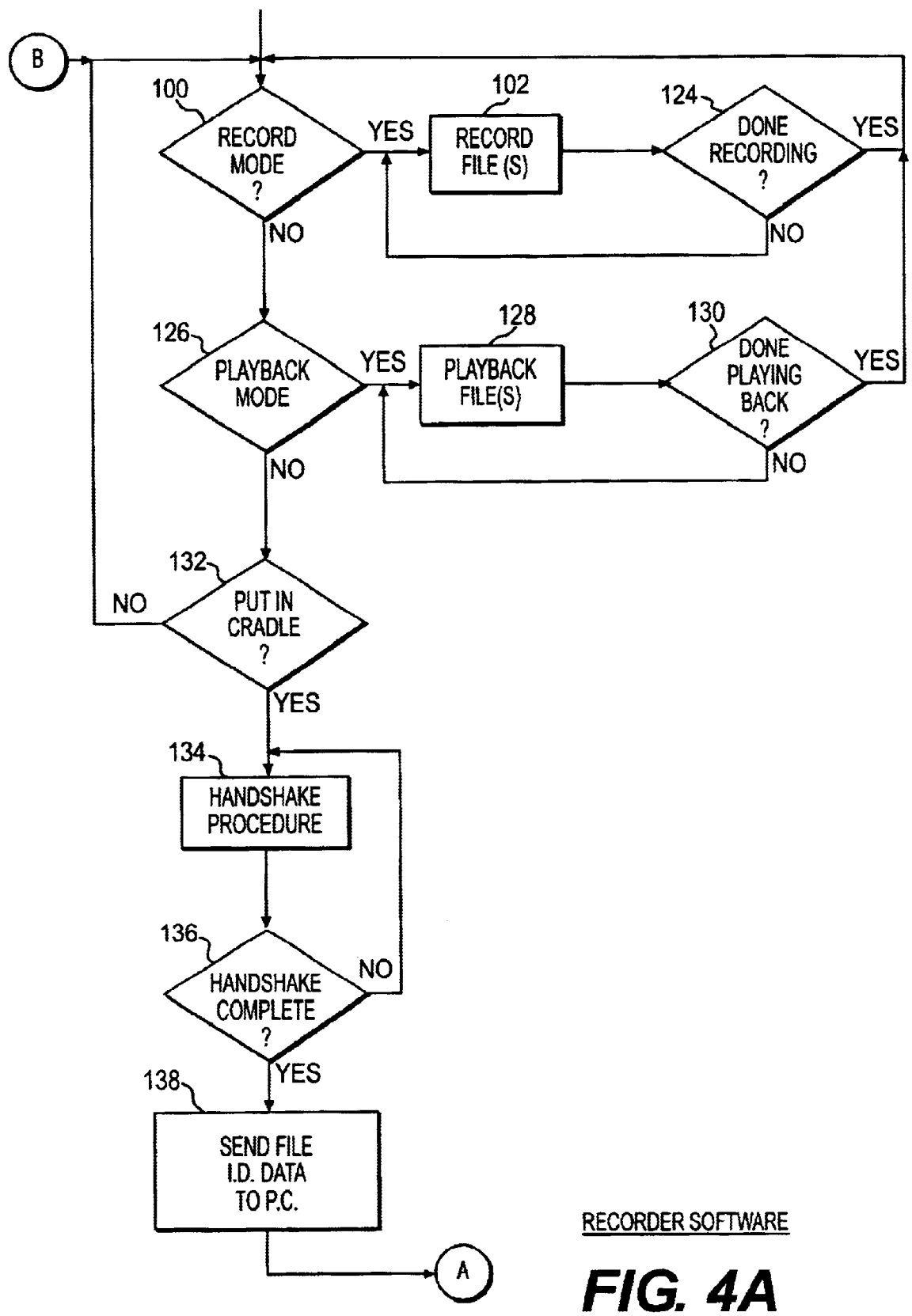
FIGS. 4A and 4B together form a flow chart which illustrates software provided to control operation of the portable recorder of FIGS. 2 and 3.
Figure 4B:
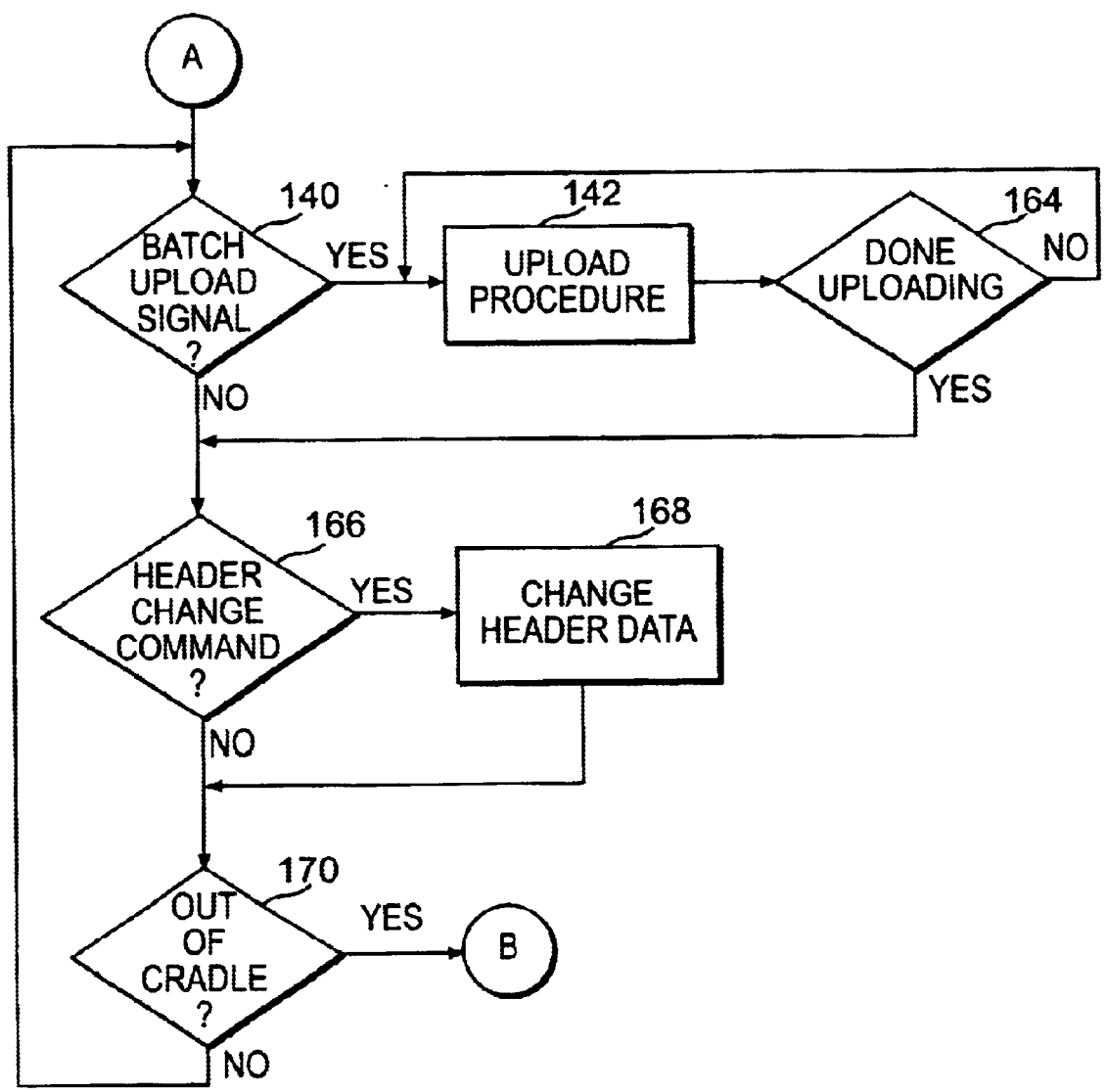

FIGS. 4A and 4B together form a flow chart which illustrates software routines which control the microprocessor 50 (FIG. 3) in connection with voice file recording, playback and management. Initially, at step 100 of FIG. 4A, it is determined whether a recording mode is accessed, either via the touch screen or by using the slide switch. If a positive determination is made at step 100, then a recording mode is entered, represented by step 102. During step 102 voice signals input via the microphone are converted to digital form, subjected to compression or other processing, and stored in the form of a voice file. Recorded with, or otherwise associated with, each voice file is header data, schematically illustrated in FIG. 5. In a preferred embodiment of the invention the header data 104 includes one or more time and date stamps 106 (corresponding to a time or times at which the voice file was originally recorded or additional voice information was added to the file); data 108 indicating the type of the file (in this case, the type being "voice"); data 110 which indicates the length (in minutes and seconds) of the corresponding voice file; data 112 which indicates the compression algorithm employed with respect to the voice file; data 114 which indicates a "folder" with which the corresponding voice file is associated (it is to be understood that the "folder" may be part of a hierarchical file management and organization system implemented in the recorder); title or other identifying data 116, which indicates a title or other name used to identify the corresponding voice file; "size" data 117 which indicates the number of data words making up the voice file; data 118 which identifies either or both of the individual user who created the voice file or the particular portable recorder which was used to create the voice file; "status" data 120, which will be described below; data 122 which may be provided to indicate links between the present voice data file and other files, including other voice data files; "source" data 123 which indicates whether the associated voice file was generated internally via the recorder microphone or downloaded from an external source, such as a voice mail system; and a "priority" flag 121, which indicates, in the case of a dictation file, whether it is to be processed on a priority basis after uploading to the PC 16 and/or transfer to central dictation system 28.

According to an alternative preferred embodiment of the invention, the user of the recorder is permitted to define up to six fields of header data which are suitable to the user's particular application. For example, if the recorder is to be used in a medical practice, the six customizable fields may correspond to such items as work type, department, procedure number, location number, medical record number, patient's date of birth. Moreover, the user may be permitted to select from among a number of different header data formats so that the header format used is one which is most appropriate to the nature or purpose of the respective voice data file.

Figure 5:
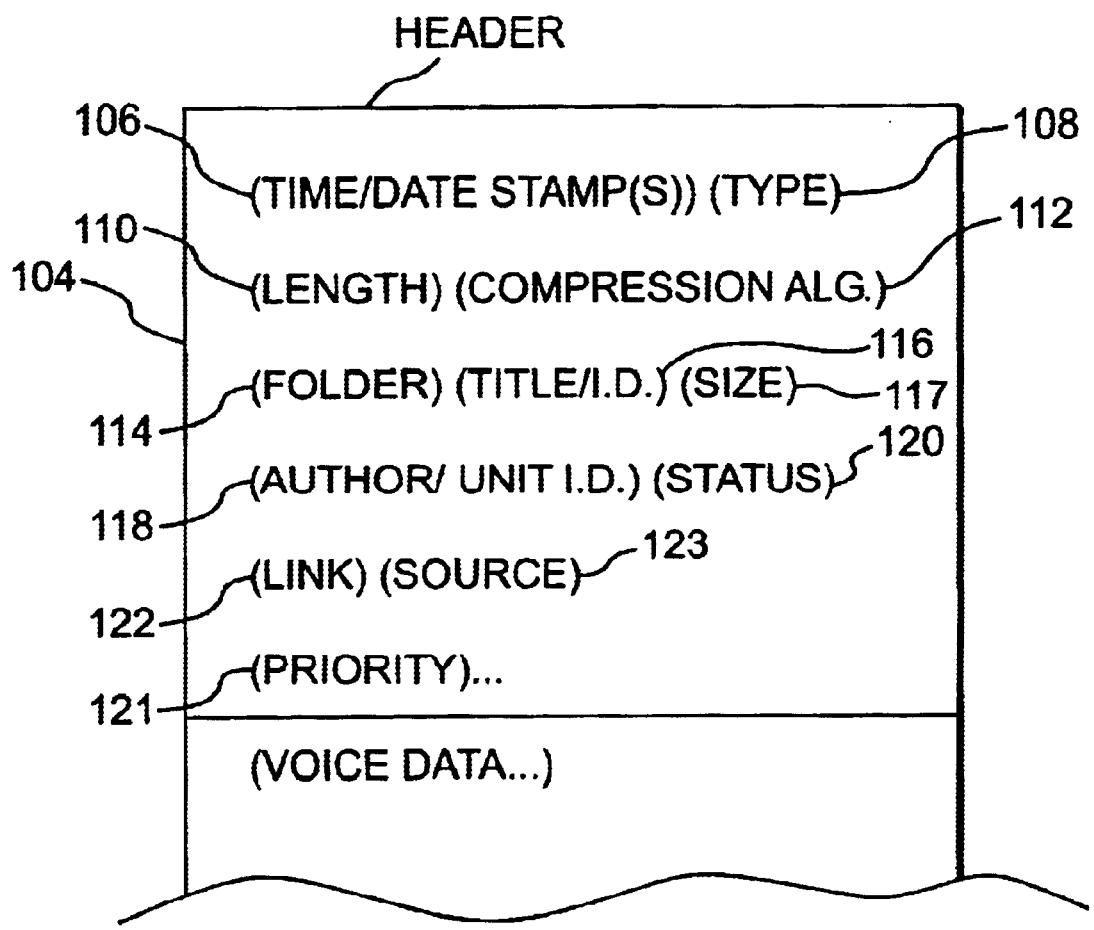
FIG. 5 illustrates a voice file format, including header data, for voice data files stored in the portable recorder.

It should be understood that the header data format shown in FIG. 5 is only an example of many possible header data formats. The order of the data may be changed, additional header data may be provided, and many of the types of data shown in FIG. 5 may be omitted. As addressed by the following discussion, it will be seen that the key elements of header data in regard to the present invention are the title or name data 116 and the status data 120.

Referring once more to FIG. 4A, step 124 indicates that the record mode of step 102 is continued unless and until the user indicates that recording is complete. At that point, the routine loops back to step 100.

If at step 100 the record mode is not invoked, it is then determined (step 126) whether the playback mode is invoked. If so, the playback mode is entered (step 128). The recorder may be arranged so that the file to be played back is the last file that was accessed (either for recording or playback); alternatively, the user may select a file for playback by navigating through folders and file icons presented via the touch screen. Completion of the playback mode is indicated at step 130, at which point the routine loops back to step 100.

If at step 126 the playback mode was not invoked, then it is determined, at step 132, whether the portable recorder has been placed in the cradle connected to the PC. If not, the routine loops back to step 100. However, if it is determined at step 132 that the recorder has been placed in the cradle, then a handshake procedure ensues (step 134) whereby data communication is established between the microprocessor of the portable recorder and the PC. The handshake procedure continues, as indicated at step 136, until it is completed. Then, as shown at step 138, the microprocessor uploads to the personal computer voice file identification data corresponding to all of the voice files (i.e. the portion of the header data indicated as "title/I.D." data 116 and discussed above in connection with FIG. 5). Other components of the header data may also be uploaded, such as "size", "type", "time/date stamp", "compression algorithm", "length", and "author", the "priority" flag, and user-defined header data fields. As will be seen, the voice file header data may be utilized by the PC to provide a GUI (graphical user interface) display indicative of the voice files stored in the portable recorder.

Following step 138, it is determined (step 140, FIG. 4B) whether a batch upload signal is received at the portable recorder. It is contemplated that the batch upload signal may be either received from the PC, or input directly into the portable recorder via the interface provided by the recorder touch screen. If a positive determination is made at step 140, then a batch upload procedure, represented by step 142, follows.

Figure 6:
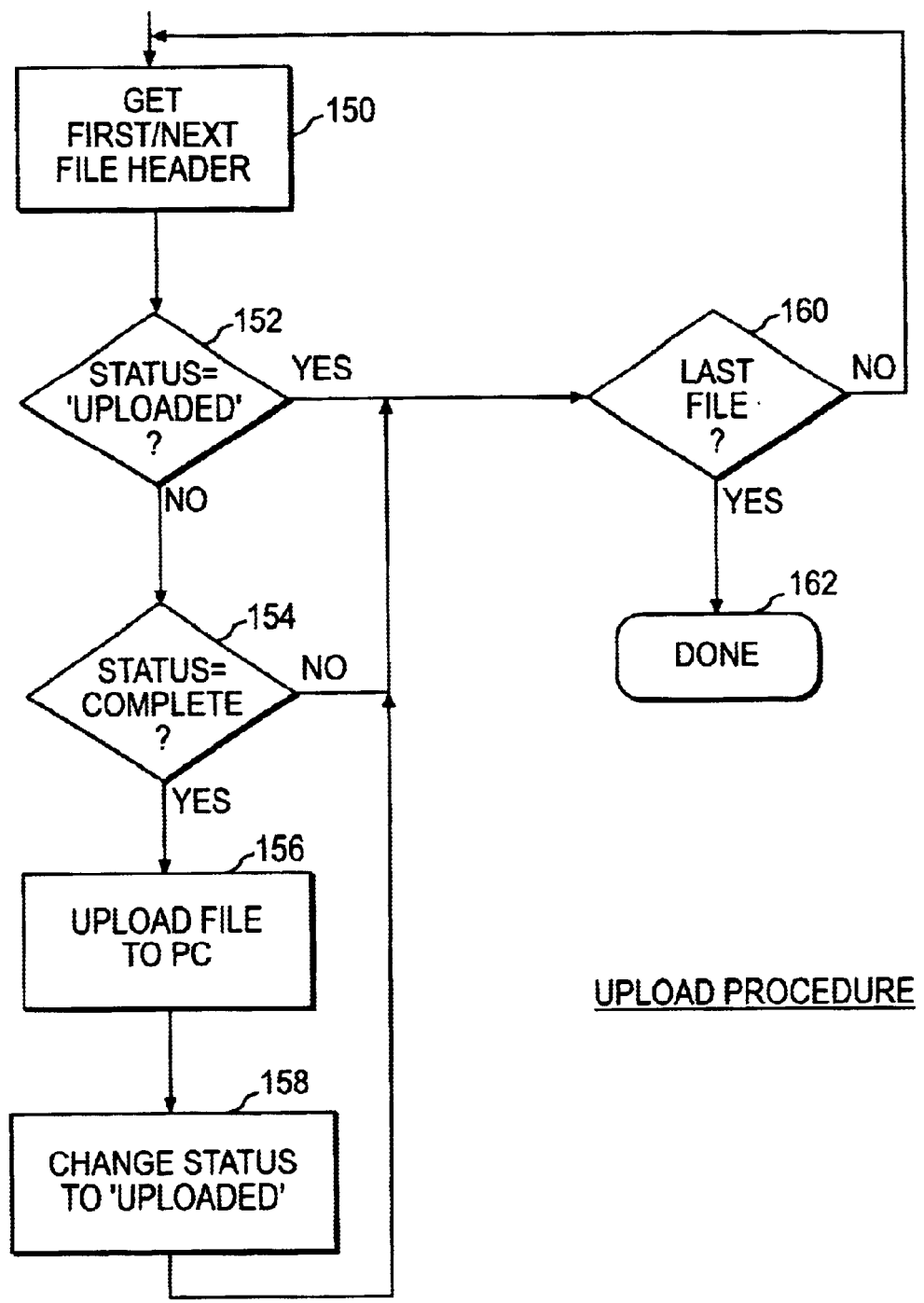
FIG. 6 is a flow chart illustrating details of an "upload procedure" block which is included in the software routine of FIG. 4B.

Details of the batch upload procedure of step 142 are illustrated in FIG. 6. As a first step of the procedure, the header data for the first voice file is accessed (step 150). Then the "status" data (header data 120, FIG. 5) is examined. According to this embodiment of the invention, the status data may have three values: (1) "uploaded", signifying that the corresponding voice file had previously been uploaded from the recorder; (2) "incomplete", indicating that the user had not completed dictation of the corresponding voice file; and (3) "complete", indicating that the user had completed dictation of the voice file and that the voice file had not previously been uploaded. It will be appreciated that the status data may be represented by a two bit code.

At step 152, which follows step 150, it is determined whether the status data indicates that the file has previously been uploaded. If not, the procedure advances to step 154, at which it is determined whether the status data indicates that the corresponding voice file is complete. In the case of a positive determination at step 154, the procedure advances to step 156, at which the corresponding voice file is uploaded to the PC. Following is step 158, at which the microprocessor changes the status data to indicate that the voice file has been uploaded.

After step 158 is step 160, at which it is determined whether the file just processed was the last voice file. If not, the procedure loops back to step 150 and the header data for the next file is accessed. Otherwise, the procedure is completed, as indicated at 162.

Referring again to steps 152 and 154, it is shown that if either an "uploaded" or an "incomplete" status is indicated by the header data for the voice file, then the corresponding voice file is not uploaded to the PC, and step 160 follows step 152 or 154, as the case may be. Consequently, the upload procedure of FIG. 6 (and step 142, FIG. 4B) operates so that when a batch upload operation is initiated, only voice files that the author has completed, and which have not been previously uploaded, are included in the batch upload operation. This prevents the voice file storage in the PC from becoming "cluttered" or "polluted" with duplicate files uploaded from the digital portable recorder, or with voice files which the author has not yet completed. This is done automatically by the portable recorder, without requiring the user to pick and choose which files are ready for uploading and have not previously been uploaded.

As specifically illustrated in FIG. 6, the upload procedure calls for updating the status data for each file (step 158) immediately after the respective file is uploaded (step 156). However, this sequence can be varied. For example, a list of files having a status appropriate for uploading can be compiled, and the status data component of the corresponding header data updated, and then the files on the list can all be uploaded to the PC to complete the upload procedure.

It is also contemplated that the step of updating the status data for each file (step 158) could be replaced with the step (not shown) of automatically deleting each file from the recorder's memory after the file has been uploaded. It could also be a user-settable operating parameter for the recorder as to whether files are automatically deleted after uploading.

Referring again to FIG. 4B, it is indicated at step 164 that the upload procedure of step 142 continues until completion (step 162, FIG. 6). Upon completion of the upload procedure, the process of FIG. 4B advances to step 166, at which it is determined whether the PC has sent to the portable recorder a command to change header data in a voice file. If such a command is received, then the header data is changed, as indicated at step 168. As will be seen, the header change command from the PC reflects actions taken by a user of the PC by operating a graphical user interface provided by the PC.

Following step 168 (or immediately following step 166, if no header change command is received) is a step 170, at which it is determined whether the portable recorder has been removed from the cradle. If so, the software routine loops back to step 100. Otherwise, the routine loops back to step 140. Accordingly, it will be noted that steps 140, 166 and 170 form a loop which continues until an upload signal is received, a header change command is received, or the recorder is removed from the cradle.

PC SOFTWARE

Figure 7A:
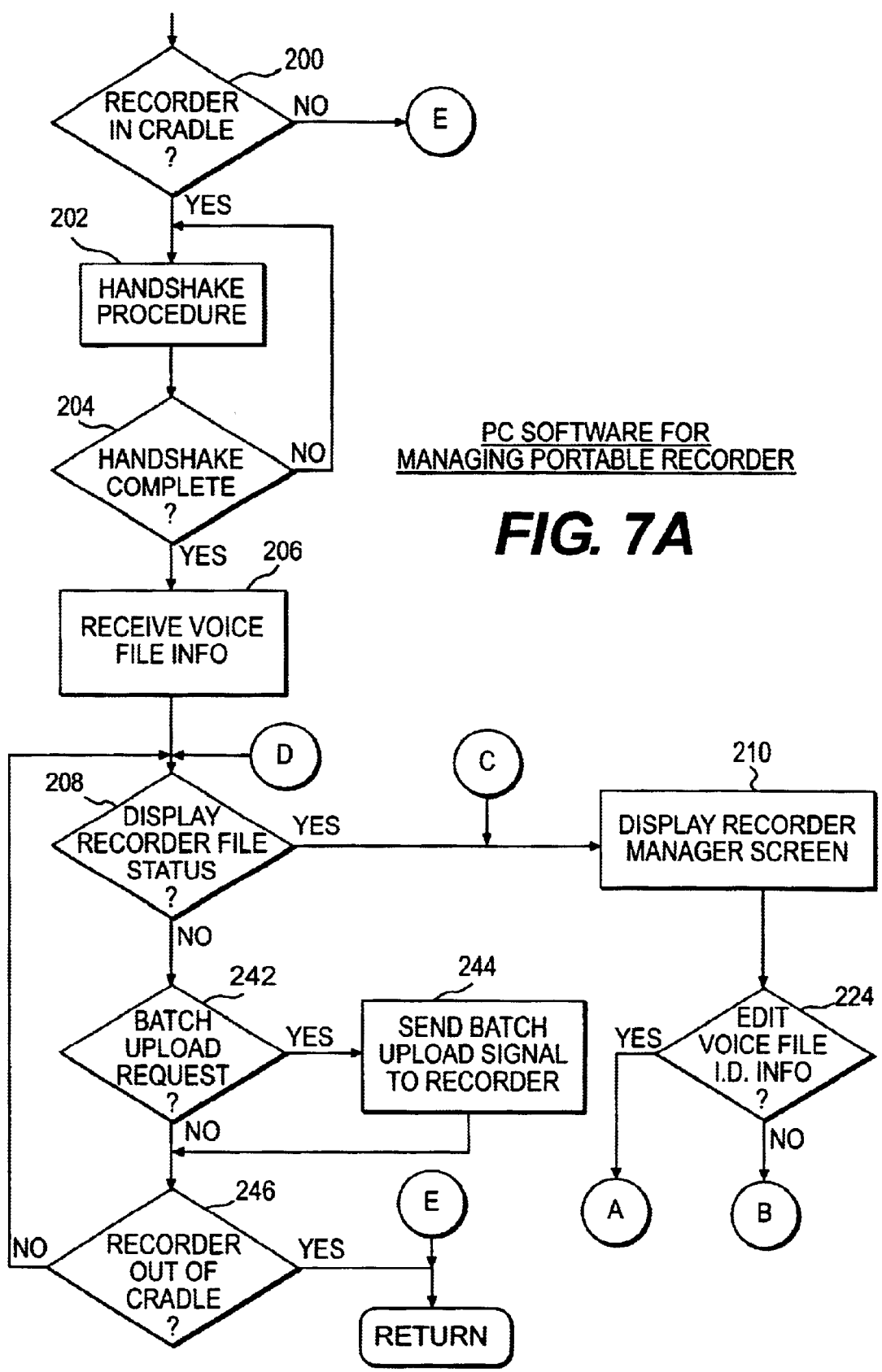
FIGS. 7A and 7B together form a flow chart which illustrates software provided for controlling a personal computer that is part of the voice data management system of FIG. 1.
Figure 7B:
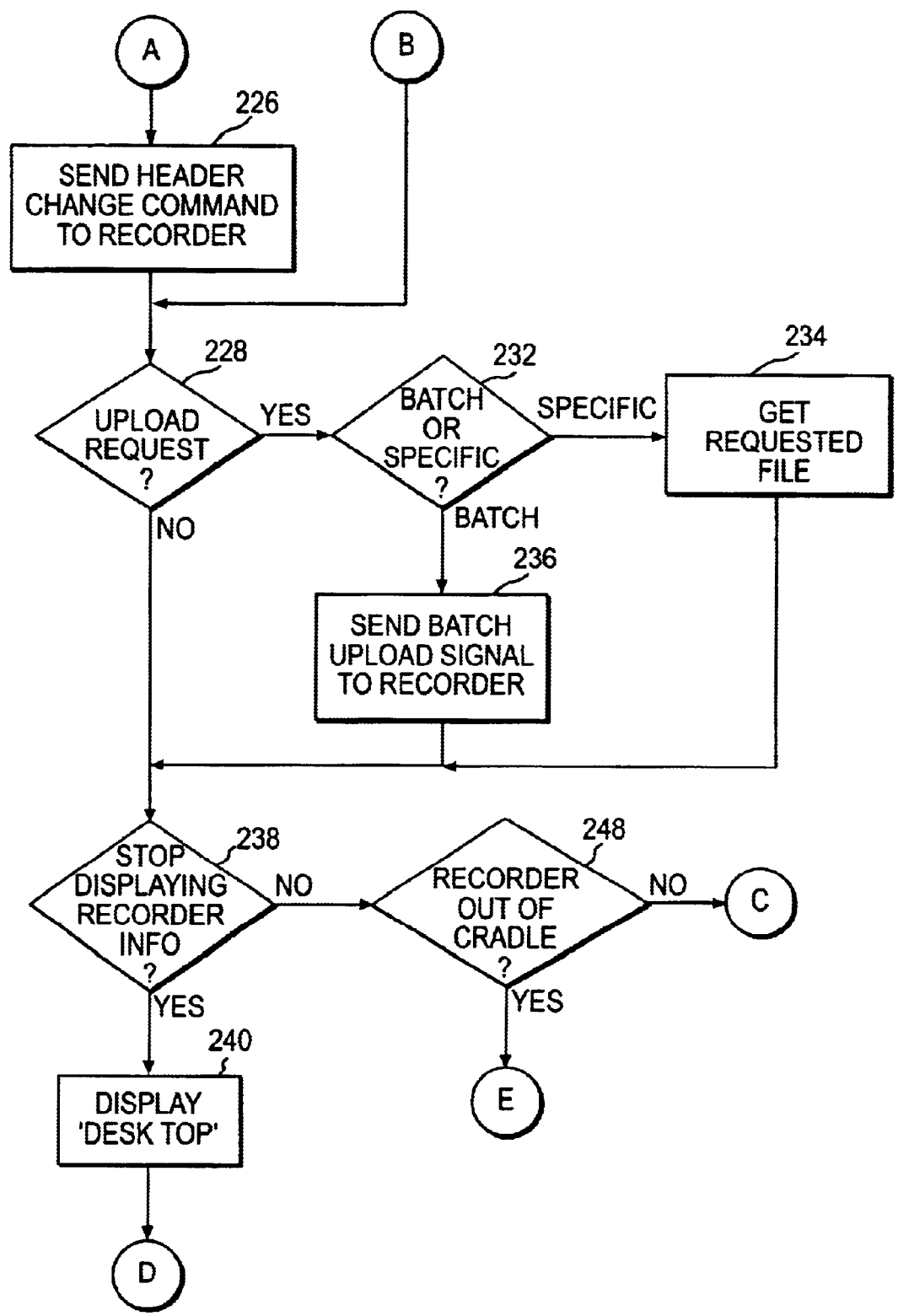

FIGS. 7A and 7B illustrate software installed in the PC to control interaction between the PC and the portable recorder. Initially in FIG. 7A is step 200, at which it is determined whether the recorder has been placed in the cradle connected to the PC. If not, control of the PC returns to other software processes maintained in the PC. However, if at step 200 it is determined that the recorder has been placed in the cradle, then step 202 follows, representing the handshake procedure which was previously referred to in connection with step 134, FIG. 4A. In FIG. 7A, step 204 indicates that the handshake procedure continues until completion. Following completion of the handshake, step 206 follows. At step 206 the PC receives the voice file identification data indicated as being sent from the portable recorder at step 138 in FIG. 4A.

Following step 206 in FIG. 7A is a step 208, at which it is determined whether the user has operated the PC so as to request the PC to display on its display 18 (FIG. 1) a screen which provides information concerning voice files stored in the portable recorder in the cradle 14. It is to be understood that the user may make such a request by, for example, invoking a menu item, or selecting an icon, displayed in a "desk top" screen (not shown) on the PC, or by another technique provided in accordance with conventional practice.

Figure 8:
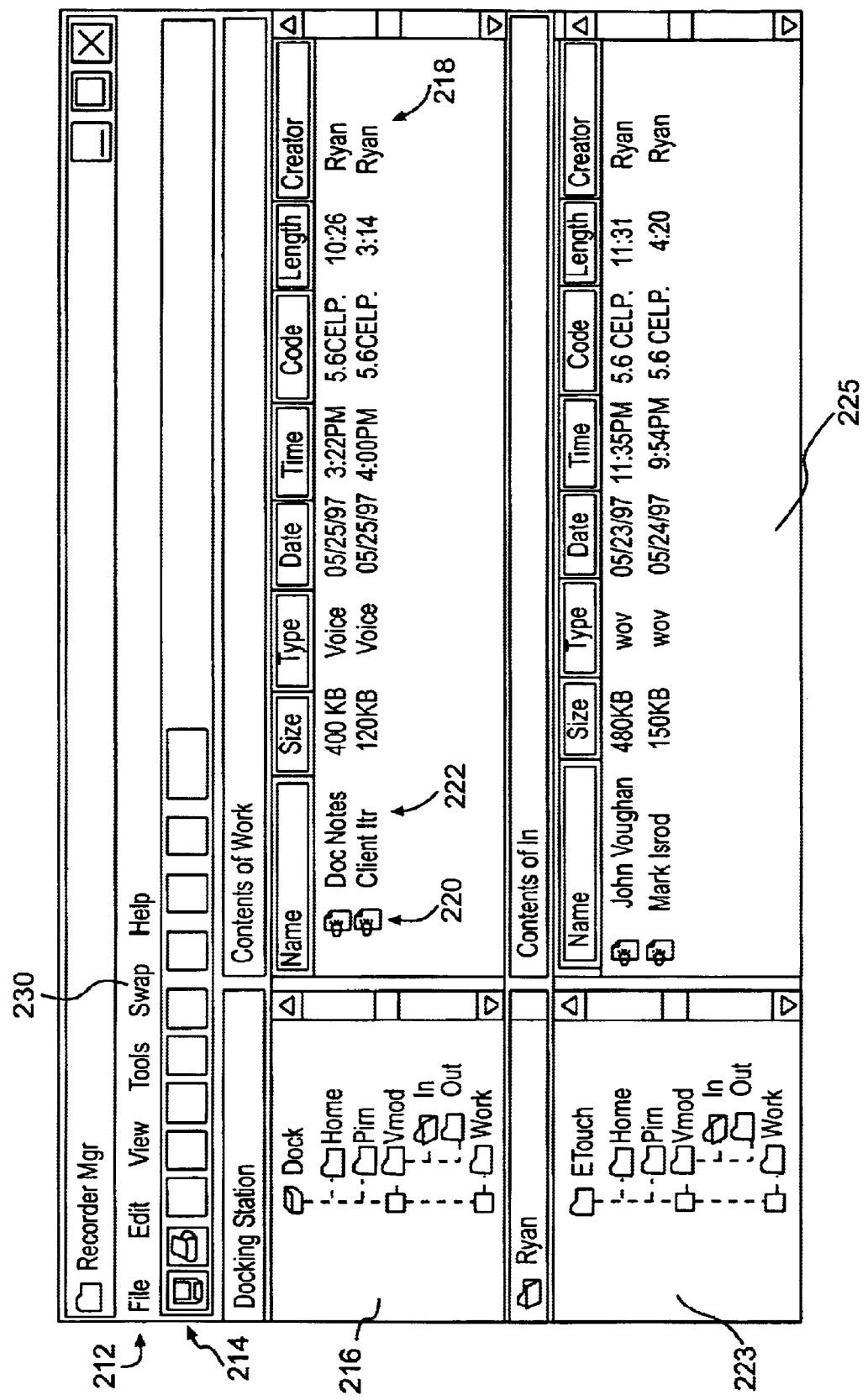
FIG. 8 is a screen display provided by the personal computer in accordance with the invention.

If at step 208 it was determined that a request for display of the recorder file contents is received, then step 210 follows, at which the requested screen is displayed. An example of such a screen display is shown in FIG. 8. The display of FIG. 8 generally conforms to the conventions for GUI's provided under the widely-used "Windows 95" operating system. The display includes familiar elements such as a menu bar 212 and a tool bar 214.

Particularly notable elements of the display of FIG. 8 are a field 216 which shows icons representing a hierarchy of files maintained in the recorder interfaced to the PC via the cradle; and another field 218 which provides specific information in regard to voice files included in a selected folder shown in field 216. Thus the benefits, including ease of use, of the PC graphical user interface are extended to management of voice files stored in the portable recorder. In particular, the field 216 allows the user to visually comprehend the file structure used to organize the files stored in the portable recorder. Field 218 allows the user to focus in on particular voice files in the recorder. Icons 220 in field 218 are each respectively indicative of a voice file stored in the portable recorder. Name information indicated at 222 corresponds to the header data component 116 (FIG. 5) for the voice files, which was uploaded to the PC at steps 138 of FIG. 4A and 206 of FIG. 7A.

Other major fields 223 and 225 in FIG. 8 respectively indicate file hierarchy, and detailed information, in regard to files stored in the PC itself (e.g., on a hard drive).

With respect to the voice files stored in the portable recorder interfaced to the PC, the display of FIG. 8 provides the user of the PC with file management options as well as information. For example, and referring once more to FIG. 7A, step 224 indicates that the user of the PC may elect to edit file-identifying (name) information corresponding to voice files stored in the recorder. This may be done by positioning a cursor (not shown) in the name text indicated at 222 in FIG. 8, and then utilizing conventional text editing techniques to change the file designation. As indicated at step 226 in FIG. 7B, if this is done then the PC sends a command to the recorder directing the recorder to change the header data component 116 for the corresponding voice data file stored in the recorder. (Execution of this command was indicated at step 168 in FIG. 4B.) The command may be considered to be a "data management signal" in that it aids in managing the voice data files stored in the portable recorder.

Another option available to the PC user in connection with the screen display of FIG. 8 is requesting uploading of voice files from the portable recorder. This option is indicated at step 228 in FIG. 7B, and may, for example, be accessed by the user as an item in a pull-down menu headed "swap" (reference numeral 230, FIG. 8).

If an upload request is made at step 228, then step 232 follows, at which it is determined whether the user has requested uploading of a specific voice file from the portable recorder, or has made a batch upload request. If the request was for a specific file, then the specific file requested is uploaded from the portable recorder to the PC (step 234). It is to be understood that the specific file requested may be selected, for example, by designating the corresponding icon in the field 218 of the display of FIG. 8. The actual uploading may be controlled directly by the PC, or by the microprocessor of the recorder in response to a suitable command from the PC.

If at step 232 a batch upload was requested, then step 236 follows, at which the PC sends a batch upload signal to the recorder. In response to this signal, the recorder undertakes the batch upload procedure which is indicated at step 142 in FIG. 4B, and which was previously described in connection with FIG. 6.

Another option available to the user, and indicated by step 238 in FIG. 7B, is to "close" the recorder management display of FIG. 8. If this option is selected, then the PC presents another display, such as the customary "desk top" display which commonly serves as a home screen in conventional graphical user interfaces (step 240). Following step 240, the process loops back to step 208.

If at step 208 the user of the PC does not elect to have the recorder manager screen displayed, the batch upload option may still be made available, as indicated at step 242 in FIG. 7A. For example, the batch upload option may be made available to the user as a menu item in the "desk top" screen (not shown) or in another screen, or by entry of a predetermined command via the keyboard. It is also contemplated that the batch upload option may be invoked via a dedicated function key. In any case, requesting the batch upload at step 242 causes step 244 to follow, which has the same effect as step 236, referred to above.

As long as the portable recorder is present in the cradle, the routine of FIGS. 7A, 7B continues to control operation of (or at least continues as one control thread in) the PC, as indicated by decision blocks 246 and 248, in FIGS. 7A and 7B, respectively.

To summarize advantages of the above-described invention, a portable digital voice recorder and a PC are programmed with respective software that makes it easy and convenient for the user to manage files stored in the portable recorder, and particularly to transfer files from the recorder to the PC or to rename files stored in the portable recorder, by use of the graphical user interface provided by the PC.

The portable digital audio recorder described herein includes a user interface based on a touch screen, in addition to a slide switch for controlling voice input and editing operations. However, it is contemplated to omit either the touch screen or the slide switch portion of the recorder's user interface. Preferably, if one of these items were omitted, it would be the touch screen, inasmuch as slide switch control of dictation functions has proven to be highly efficient, and is preferred by many sophisticated users of dictation equipment.

The combination disclosed herein of a portable digital audio recorder with a slide switch control interfaced to a personal computer operable via a conventional graphical user interface represents a marriage of two particularly powerful user interfaces having very different but complementary strengths. The time-tested utility of slide switch control of dictation functions allows the user to create a variety of documents in audio form with great efficiency, in a device that can be easily carried with the user and operated in many environments. Unlike most laptop PC's or PDA's (personal digital assistants), the portable audio recorder disclosed herein is well-adapted to one-sided, eyes-free operation.

When the portable recorder is interfaced to the GUI-operable personal computer, the present invention teaches how sophisticated, file-management capabilities that have developed in the personal computer art can be extended to the voice files stored in the portable recorder.

According to the above description of the invention, the batch uploading process was managed by a control circuit resident within the recorder itself. As an alternative, however, batch uploading can be managed by the PC, which can review the status information for each of the voice files stored in the PC and can request uploading of each file which has a suitable status.

It is contemplated to use the status information for purposes other than selecting voice data files for uploading. For example, when the voice data recording capacity of the portable recorder memory is exhausted, files having the status "uploaded" may be overwritten first by new voice data, followed by overwriting the oldest complete but not uploaded files. The portable recorder could also be arranged for a fourth status data value (beyond the three values discussed above), corresponding to complete, not uploaded but "dispensable".

It may also be contemplated to include in the portable recorder and/or PC software an "override upload" function whereby all voice files in the recorder are uploaded to the PC regardless of the status of the voice files. One case in which this function would be useful would occur when the recorder is interfaced to a second PC after having uploaded some or all of its voice files to a first PC.

Although the portable recorder shown herein includes both embedded and removable memory devices, it is contemplated to omit one or the other of the memory devices or to include additional memory.

It should be noted that the hardware and data communication environment illustrated and described in connection with FIGS. 1–3 may be changed in a number of other respects without departing from the invention. For example, among other changes which may be made in the recorder 12, the touch screen 32 may be omitted in favor of a one or two line character display (not shown). In such a case, additional switches, which may include software-programmable keys, may be added to provide aspects of the user interface. The switches may include a thumb-wheel switch to be used for scrolling among menu items. The recorder may also include a key pad and/or a bar code reader. These items may be permanently installed as part of the recorder, or may be provided as one or more optional snap-on modules. The key pad and bar code reader may be employed to enter header data and for other purposes.

In addition to or instead of the cradle-based data link between the recorder 12 and the PC 16, data communication may be established between the recorder and the PC by a wireless RF link and/or infrared data communication. One type of communication that may be used is the well-known IRDA technique. Moreover, the cradle referred to above may be changed to permit serial (e.g. RS-232 or USB) data communication or IR data communication between the PC and the recorder.

It should also be understood that the data communication between the PC 16 and other components of the voice data management system 10 (FIG. 1) may be implemented by connections other than or in additional to the local area network 24 referred to above. Thus, one or more of dial-up telephone data lines, dedicated telephone data channels, a wide area network, and/or wireless data communication may be provided to interconnect system components. The constituents of the voice data management system may be more or fewer in number than those shown in FIG. 1. For example, more than one central dictation system may be connected to the PC 16.

It is to be understood that the above description may indicate to those skilled in the art additional ways in which the principles of this invention may be used without departing from the spirit of the invention. The particularly preferred methods and apparatus are thus intended in an illustrative and not limiting sense. The true spirit and scope of the invention are set forth in the following claims.

What is claimed is:

1. A voice data management system, comprising:
   a portable digital voice recorder, including a housing shaped and sized to fit in a user's hand, a microphone secured to said housing, and memory means mounted in said housing for storing voice data files which correspond to audio signals generated by said microphone, said memory means also storing respective status data for each voice data file stored by said memory means, said status data for indicating a status of the respective voice data file;
   a personal computer;
   means for providing a data signal transmission path connecting said memory means to said personal computer; and
   control means for receiving an upload signal and for responding to the received upload signal by (a) selecting ones of said voice data files on the basis of the respective status data for the voice data files, and (b) uploading the selected voice data files to the personal computer via said data signal transmission path.

2. A voice data management system according to claim 1, wherein said memory means stores respective header data associated with each of said voice data files, the header data including file name information for the respective voice data file and also including said status data for the respective voice data file.

3. A voice data management system according to claim 1, wherein said control means changes the status data corresponding to said selected and uploaded voice data files.

4. A voice data management system according to claim 1, wherein said control means is mounted inside said portable recorder housing and controls operation of said portable recorder.

5. A method of uploading voice data files from a portable digital voice recorder to a data processing device, the method comprising the steps of:
   storing voice data files in the portable digital voice recorder;
   associating respective status data with each voice data file stored in the portable digital voice recorder;
   interfacing the portable digital voice recorder to the data processing device to permit data communication between the recorder and the data processing device; and
   selectively transferring the stored voice data files from the portable digital voice recorder to the data processing device in accordance with the respective status data associated with each stored voice data file.

6. A method according to claim 5, further comprising the step of changing the status data associated with each voice data file transferred at said transferring step.

7. A method according to claim 6, wherein said data-changing step is performed after said transferring step.

8. A method according to claim 5, wherein the data processing device is a personal computer.

9. A voice data management system, comprising:
   a portable digital voice recorder, including a housing shaped and sized to fit in a user's hand, a microphone secured to said housing, and memory means mounted in said housing for storing voice data files which correspond to audio signals generated by said microphone, said memory means also storing respective status data for each voice data file stored by said memory means, said status data for indicating a status of the respective voice data file;
   a personal computer;
   means for providing a data signal transmission path connecting said memory means to said personal computer; and
   control means for receiving an upload signal and for responding to the received upload signal by (a) uploading to the personal computer at least some of said voice data files stored by said memory means, and (b) changing the status data for the uploaded voice data files.

10. A voice data management system according to claim 9, wherein said control means changes the status data for uploaded voice data files after the same have been uploaded to the personal computer.

11. A voice data management system according to claim 9, wherein said control means changes the status data for uploaded voice data files before the same have been uploaded to the personal computer.

12. A voice data management system according to claim 9, wherein said memory means is a removable solid state memory card.

13. A voice data management system, comprising:
   a portable digital voice recorder, including a housing shaped and sized to fit in a user's hand, a microphone secured to said housing, memory means mounted in said housing for storing voice data files which correspond to audio signals generated by said microphone, said memory means also storing respective header data associated with each of said voice data files stored by said memory means, said header data including data for identifying the respective voice data files, and control means mounted in said housing for controlling operation of said recorder;
   a personal computer including a display and a cursor control device, said personal computer running software for providing a graphical user interface, said interface allowing a user of the personal computer to cause the personal computer to generate a data management signal; and
   means, interconnecting said personal computer and said control means of said portable digital voice recorder, for transmitting said data management signal from said personal computer to said control means;
   said control means responding to said data management signal by changing the header data associated with at least one of said voice data files stored by said memory means.

14. A voice data management system according to claim 13, wherein said graphical user interface displays an alphanumeric field corresponding to said header data stored in the recorder memory means, and said data management signal is generated in response to the user editing the alphanumeric field displayed by said graphical user interface.

15. A voice data management system, comprising:

a portable digital voice recorder, including a housing shaped and sized to fit in a user's hand, a microphone secured to said housing, memory means mounted in said housing for storing voice data files which correspond to audio signals generated by said microphone, said memory means also storing respective header data associated with each of said voice data files stored by said memory means, said header data including data for identifying the respective voice data files, and control means mounted in said housing for controlling operation of said recorder;

a personal computer including a display and a cursor control device, said personal computer running software for providing a graphical user interface;

means for providing a data signal transmission path connecting said memory means to said personal computer; and upload means for uploading to said personal computer header data associated with voice data files stored by said memory means and not uploaded to said personal computer.

16. A voice data management system according to claim 15, wherein said graphical user interface includes icons on said display corresponding to voice data files stored in the portable digital voice recorder.

17. A method of operating a portable digital voice recorder, comprising the steps of:

storing voice data files in the recorder;

storing header data in the recorder in association with the stored voice data files;

interfacing the recorder to a personal computer which includes a display; and displaying on the display icons corresponding to the voice data files stored in the recorder.

18. A method according to claim 17, wherein said displayed icons include alphanumeric information corresponding to the header data stored in the recorder; and further comprising the steps of:

operating the personal computer to change the alphanumeric information included in the displayed icons; and changing the corresponding header data in the recorder in response to said change in the alphanumeric information included in the displayed icons.

\* \* \* \* \*